July 11, 1944.   L. FRANK   2,353,132
DISPENSING CONTAINER
Filed Nov. 25, 1942   2 Sheets-Sheet 1
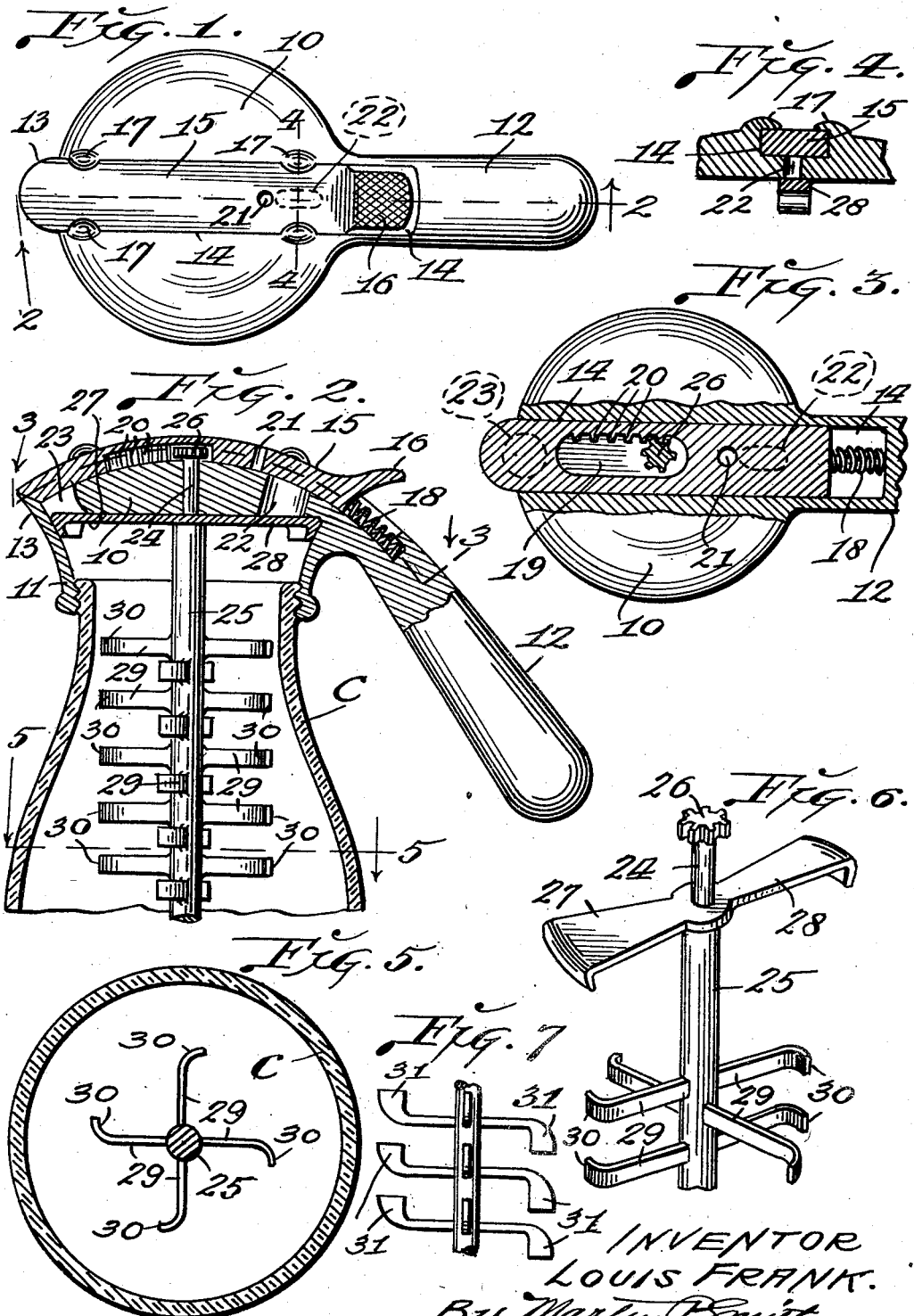
INVENTOR
LOUIS FRANK.
By Martin P. Smith, Atty.

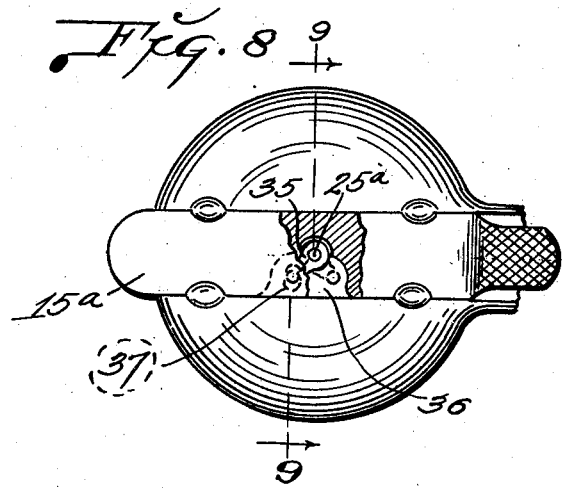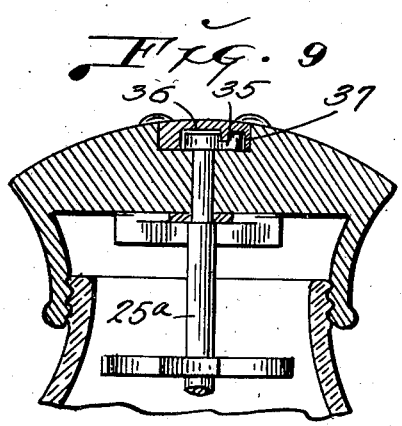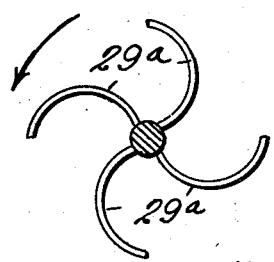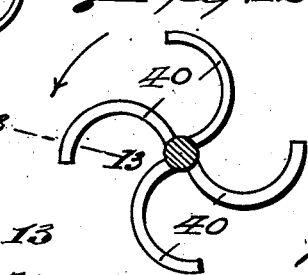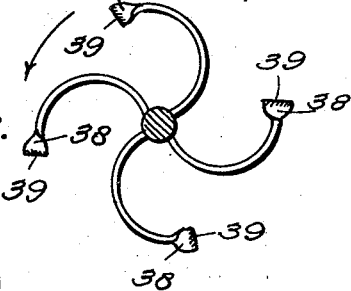

Patented July 11, 1944

2,353,132

UNITED STATES PATENT OFFICE 2,353,132

DISPENSING CONTAINER

Louis Frank, Taft, Calif., assignor of one-third to Adolph Reader, Taft, Calif.

Application November 25, 1942, Serial No. 466,841

3 Claims. (Cl. 259—117)

My invention relates to a dispensing container of the type disclosed in U. S. Letters Patent No. 2,289,880 issued to me July 14, 1942, and the principal objects of my present invention are, to generally improve upon and simplify the construction of the dispenser covered by my aforesaid patent as well as other dispensing containers now on the market; to provide a dispensing container closure wherein practically all of the parts are formed of plastic or other non-rusting, non-corrodible material, and further, to provide the dispensing closure with simple, practical and effective means for stirring the contents of the container simultaneous with the opening and closing of the valvular means that controls the discharge opening of the closure.

A further object of my invention is to provide novel and efficient forms of arms for the member that stirs the contents of the container to which the dispensing head is applied.

With the foregoing and other objects in view, my invention consists in certain novel features of construction and arrangement of parts which will be hereinafter more fully described and claimed and illustrated in the accompanying drawings in which:

Fig. 1 is a top plan view of my improved dispensing container.

Fig. 2 is a vertical section taken on the line 2—2 of Fig. 1.

Fig. 3 is a horizontal section taken on the line 3—3 of Fig. 1.

Fig. 4 is an enlarged detail section taken on the line 4—4 of Fig. 1.

Fig. 5 is a horizontal section taken on the line 5—5 of Fig. 2.

Fig. 6 is a perspective view of the rotary member which stirs the contents of the container and which controls an air inlet opening and the contents outlet opening in the closure.

Fig. 7 is a side elevational view of a modified form of the rotary stirring member.

Fig. 8 is a plan view of a modified view of the dispensing container with parts broken away and in section.

Fig. 9 is a cross section taken on the line 9—9 of Fig. 8.

Figs. 10, 11 and 12 are plan views of modified forms of the stirring means.

Fig. 13 is an enlarged section taken on the line 13—13 of Fig. 12.

Referring by numerals to the accompanying drawings which illustrate a preferred embodiment of my invention, 10 designates the circular body of the closure, the same having a convex upper surface and formed integral with the margin of the body is a depending flange 11, the lower portion of which is provided with an internal thread which engages a corresponding external thread on the upper end of the container C to which the closure is applied.

This container may be of any shape, may be formed of glass, plastic or metal and may contain any readily mobile powdered or granular substances, or heavy liquids, such as oil, syrup, strained honey, or any of the liquid and semi-liquid creams and soaps used by cosmeticians.

Extending outwardly and downwardly from the edge of body 10 is a handle 12 and projecting from said body diametrically opposite said handle is a pouring lip 13.

Formed in the convex top of body 10 and extending from the pouring lip 13 into the upper portion of handle 12 is a groove or channel 14. Arranged to slide freely in groove 14 is a longitudinally curved plate 15, the forward end of which normally covers the pouring lip 13 and projecting upwardly from the rear end of this plate is a short arm or lug 16 that is adapted to be engaged by the thumb of the user's hand.

Plate 15 is retained for sliding movement in groove 14 by any suitable means, preferably small lips 17 which project from the top of body 10 over the side edges of said plate.

Interposed between the rear end of plate 15 and the rear end of groove 14 is an expansive spring 18 which yieldingly resists rearward movement of said plate.

Formed in the underside of the central portion of plate 15 is a short longitudinally disposed recess 19 and formed along one side thereof is a series of rack teeth 20.

Formed through plate 15 to the rear of recess 19 is an aperture 21 and formed through body 10 rearwardly of said aperture when the plate is in its normal position is a longitudinally disposed slot 22.

Formed through body 10 within pouring lip 13 is an opening 23, through which the contents of the container are dispensed and this opening is normally covered by the forward end of sliding plate 15.

Journalled for rotation in a bearing in the center of body 10 is the upper portion 24 of a shaft 25 which extends downward into container C and mounted on the upper end of shaft portion 24 is a pinion 26 which engages rack teeth 20.

Formed integral with or fixed to the lower portion of shaft member 25, are the inner ends of a pair of oppositely arranged plates 27 and 28 which have rubbing contact with the underface of body 10 and which normally close, respectively, the content discharge opening 23 and air inlet slot 22.

Formed integral with the lower portion of the shaft 25 is a series of stirring arms or fingers 29, the same being preferably arranged in pairs, with the members of each pair projecting from the shaft in opposite directions and each pair being arranged at 90 degrees relative to the next adjacent pair.

As illustrated in Fig. 6, the end portions 30 of the stirring arms are curved horizontally forward in the direction of travel of said arms as the shaft is rotated by rearward, or opening movement of plate 16, which action takes place just prior to the tilting of the container and discharge of a portion of the contents thereof.

Thus, the forwardly curved ends of the stirring arms, in their forward movement, plough through the contents of the container and tend to move those portions of the contents immediately in front of said arms, toward the center of said container thereby effecting the desired results.

In some instances it may be found desirable to move the sliding plate 15 rearwardly several times before tilting the container to dispense a portion of its contents, for by such action, a very thorough stirring of all of the contents of the container is accomplished.

In Fig. 7 I have shown a modified construction wherein the outer ends of the some of the stirring arms are extended upward and others downward and said extended ends being widened as designated by 31, which arrangement provides for a very effective stirring action in the pulverized or liquid contents of the container.

To dispense a portion of the contents of container C, handle 12 is grasped in the hand and by pressure of the thumb on lug 16, plate 15 is drawn rearwardly thereby compressing spring 18.

As the plate is thus moved rearwardly, teeth 20 engage and rotate pinion 26, thereby rotating shaft 25 carrying the arms or fingers 29 so that the same stir the contents of the container and simultaneously, plates 27 and 28 are shifted so as to uncover slot 22, also discharge openings 23.

During the greater portion of the rearward travel of plate 15, and while the same is held in rearward position to uncover opening 23, aperture 21 registers with slot 22, thereby permitting air to enter the container while a portion of the contents is discharging therefrom.

While plate 15 is held in rearward position the container is tilted so as to enable the contents of said container, or a portion thereof, to discharge through opening 23 and flow from lip 13 and when pressure on lug 16 is released, spring 18 will act to move plate 15 to its normal forward position, thereby closing opening 23 and moving aperture 21 out of registration with slot 22.

As plate 15 returns to its normal position shaft 25 is reversely rotated and thus plates 27 and 28 are returned to their normal positions to close opening 23 and slot 22 and thus said opening and slot are doubly closed or cut off to effectively prevent the ingress of air and the egress of any volatilization from the contents of the container.

It will be noted that the closing movement is effected by plate 15 in one direction and the rotary movement of plates 27 and 28 in directions approximately at right angles to the movement of said plate.

In producing my improved dispenser, the heads 10 and 12 may be integrally formed of plastic or the like and likewise as shaft 25, stirring arms 29 and plates 27 and 28 may be integrally molded from plastics, or plates 27 and 28 and pinion 26 may be separately formed and permanently secured to shaft 25 by the use of acetone or a suitable adhesive.

In Figs. 8 and 9 I have shown a modified structure wherein the stirring shaft 25ª carries at its upper end, a short crank arm 35 which operates within a recess 36, in the underside of sliding plate 15ª and the pin on the end of said crank arm engages in a short transverse slot 37, in plate 15ª.

Thus, as sliding plate 15ª is shifted lengthwise the actuation of crank arm imparts rotary movement to the stirring shaft 25ª.

In Fig. 10 I have shown the the stirring arms 29ª carried by the stirring shaft curved throughout their lengths and in Fig. 11 the ends of the curved arms are shown provided on their ends with short horizontally disposed plates 38, that may have their forward edges 39 sharpened so as to readily plough through the contents of the container and stir same.

In Figs. 12 and 13 the stirring arms 40 which are curved throughout their lengths, are substantially V-shaped in horizontal section with their apices forwardly presented.

Thus it will be seen that I have provided a dispensing container that is simple, strong and durable in structure, inexpensive of manufacture and very effective in performing the functions for which it is intended.

It will be understood that minor changes in the size, form and construction of the various parts of my improved dispensing container may be made and substituted for those herein shown and described without departing from the spirit of the invention, the scope of which is set forth in the appended claims.

I claim as my invention:

1. The combination with a container, of a closure detachably applied to said container, said closure having a discharge opening, a handle projecting from said closure, a spring pressed plate mounted for sliding movement on said closure and normally closing said discharge opening, said closure provided with an air inlet opening, said plate provided with an air inlet opening which registers with the air inlet opening in the closure when said plate is at its rearward limit of movement, a shaft journalled in the center of said closure and extending downwardly into said container, driving connections between said sliding plate and shaft, and a plate carried by said shaft and positioned against the underface of said closure, which plate normally closes said discharge opening and the air inlet opening in said closure, stirring fingers projecting from said shaft.

2. The combination with a container, of a closure detachably mounted on said container, said closure having a contents discharge opening and an air inlet opening, a spring pressed plate mounted for sliding movement on said closure and normally closing said discharge and inlet openings, said plate provided with an aperture which registers with the air inlet opening when said plate is drawn rearward to open the discharge opening, a plate mounted for rotation on the underside of said closure and normally closing said discharge opening and air inlet opening and means actuated by the rearward movement of said first mentioned plate for imparting rotary movement to said second mentioned plate.

3. The combination as set forth in claim 2 and with means depending from said second mentioned plate for stirring the contents of said container.

LOUIS FRANK.